(12) United States Patent
Mariott et al.

(10) Patent No.: US 11,518,825 B2
(45) Date of Patent: Dec. 6, 2022

(54) CATALYST FORMULATIONS

(71) Applicant: Univation Technologies, LLC, Houston, TX (US)

(72) Inventors: Wesley R. Mariott, Freeport, TX (US); John F. Szul, S. Charleston, WV (US); Haiqing Peng, Sugar Land, TX (US); James M. Farley, League City, TX (US); Bruce J. Savatsky, Kingwood, TX (US); Brandon C. Locklear, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 126 days.

(21) Appl. No.: 17/040,166

(22) PCT Filed: Mar. 4, 2019

(86) PCT No.: PCT/US2019/020479
§ 371 (c)(1),
(2) Date: Sep. 22, 2020

(87) PCT Pub. No.: WO2019/182746
PCT Pub. Date: Sep. 26, 2019

(65) Prior Publication Data
US 2021/0115168 A1    Apr. 22, 2021

Related U.S. Application Data

(60) Provisional application No. 62/647,099, filed on Mar. 23, 2018.

(51) Int. Cl.
*C08F 4/02* (2006.01)
*C08F 4/76* (2006.01)
*C07F 17/00* (2006.01)
*C08F 10/02* (2006.01)

(52) U.S. Cl.
CPC .............. *C08F 4/76* (2013.01); *C07F 17/00* (2013.01); *C08F 4/02* (2013.01); *C08F 10/02* (2013.01); *C08F 2420/10* (2021.01)

(58) Field of Classification Search
CPC ........................................................ C08F 4/02
See application file for complete search history.

(56) References Cited

U.S. PATENT DOCUMENTS

| | | | |
|---|---|---|---|
| 8,742,041 | B2 | 6/2014 | Pequeno et al. |
| 2008/0096761 | A1 | 4/2008 | Mihan et al. |
| 2013/0253153 | A1 | 9/2013 | Pequeno et al. |
| 2018/0051111 | A1 | 2/2018 | Pannell et al. |

FOREIGN PATENT DOCUMENTS

| | | |
|---|---|---|
| WO | 95/13305 | 5/1995 |
| WO | 96/14155 | 5/1996 |
| WO | 2015153082 | 10/2015 |

OTHER PUBLICATIONS

International Search Report & Written Opinion for related PCT Application No. PCT/US2019/020479, dated Sep. 25, 2019 (21 pgs).
International Preliminary Report on Patentability for related PCT Application No. PCT/US2019/020479, dated Oct. 8, 2020 (13 pgs).

*Primary Examiner* — Caixia Lu
(74) *Attorney, Agent, or Firm* — Brooks, Cameron & Huebsch, PLLC

(57) ABSTRACT

Embodiments of the present disclosure are directed towards catalyst formulations including a metallocene and a stearic compound selected from bis 2-hydroxyethyl stearyl amine, aluminum distearate, and combinations thereof, where the metallocene is represented by the following formula: (Formula (I)) wherein each n-PR is n-propyl, and each X is independently $CH_3$, Cl, or F.

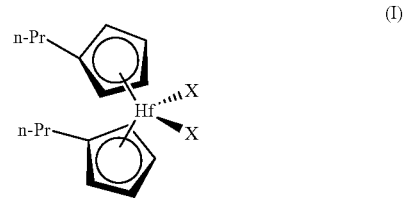

1 Claim, 1 Drawing Sheet

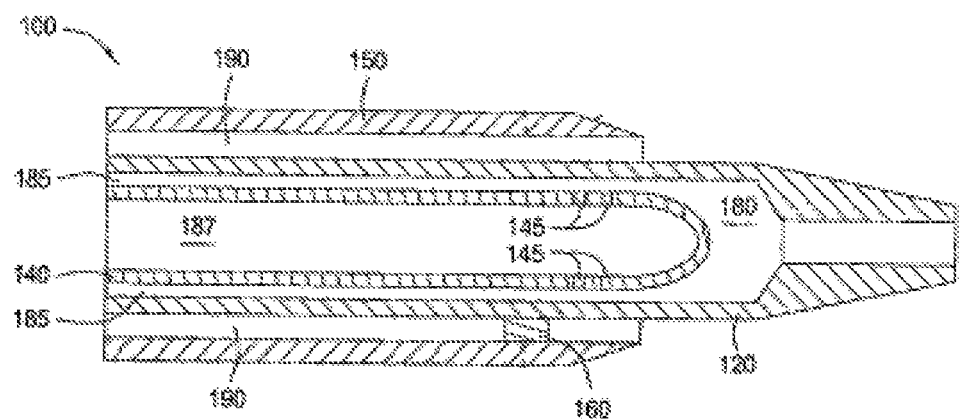

CATALYST FORMULATIONS

This application is a National Stage Application under 35 U.S.C. § 371 of International Application Number PCT/US2019/020479, filed Mar. 4, 2019 and published as WO 2019/182746 on Sep. 26, 2019, which claims the benefit to U.S. Provisional Application 62/647,099, filed Mar. 23, 2018, the entire contents of which are incorporated herein by reference in its entirety

FIELD OF DISCLOSURE

Embodiments of the present disclosure are directed towards catalyst formulations.

BACKGROUND

Polymers may be utilized for a number of products including films, among others. Polymers can be formed by reacting one or more types of monomer in a polymerization reaction. There is continued focus in the industry on developing new and improved materials and/or methods that may be utilized to form polymers.

BRIEF DESCRIPTION OF THE DRAWINGS

FIG. 1 illustrates a schematic diagram of an effervescent catalyst injector in accordance with one or more embodiments described.

SUMMARY

The present disclosure provides catalyst formulation including a metallocene and a stearyl containing compound selected from bis 2-hydroxyethyl stearylamine, aluminum distearate, and combinations thereof, where the metallocene is represented by the following formula:

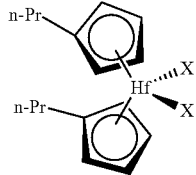

wherein each n-Pr is n-propyl, and each X is independently $CH_3$, Cl, Br or F.

The present disclosure provides a method including calcining a support at a calcination temperature in a range from 200 to 650° C.; combining the calcined support with a catalyst formulation including a metallocene and a stearyl containing compound to form the catalyst formulation, wherein the stearyl containing compound is selected from bis 2-hydroxyethyl stearyl amine, aluminum distearate, and combinations thereof, and wherein the metallocene is represented by the following formula:

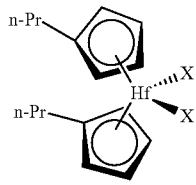

wherein each n-PR is n-propyl, and each X is independently $CH_3$, Cl, Br or F.

The present disclosure provides a method including removing a portion of support particles that are more than 1.0, 1.5, 2.0, 2.5, or 3.0 standard deviations away from a mean particle diameter of a whole support particle population; forming a catalyst formulation that includes a portion of retained support particles; and utilizing the catalyst formulation in a gas phase polymerization.

The present disclosure provides a method including injecting a catalyst formulation into a gas phase polymerization reactor via a catalyst injector having a support tube velocity that is at least 1.0 times greater than a catalyst tube velocity.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The present disclosure provides catalyst formulations including a metallocene and a stearyl containing compound selected from bis 2-hydroxyethyl stearyl amine, aluminum distearate, and combinations thereof, where the metallocene is represented by the following formula:

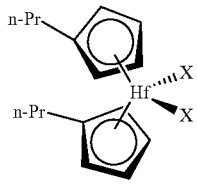

where each n-PR is n-propyl, and each X is independently $CH_3$, Cl, or F.

The catalyst formulations disclosed herein can have one or more properties that are desirable for various applications. For instance, the catalyst formulations may be feed into a gas phase polymerization reactor. Advantageously, utilizing the catalyst formulations may help reduce gel formation. While not being bound to theory, the reduction of gel formation may result from a reduction of agglomeration of small, hot catalyst particles and/or the scavenging of unbound active species in the gas phase polymerization reactor.

Embodiments of the present disclosure provide that the catalyst formulations disclosed herein are pre-blended, i.e. are blended prior to being feed to the gas phase polymerization reactor. As such, the catalyst formulations disclosed herein may be free from, i.e., contain no, polymerization components such as reactant olefins, e.g., ethylene and comonomer, and hydrogen, among others. Upon being introduced into the gas phase polymerization reactor, the catalyst formulation components, e.g., the metallocene and/or the stearyl containing compound(s) may interact with polymerization reactants. While not being bound to theory, pre-blending the catalyst formulations may help to increase contact of the metallocene and the stearyl containing compound(s) during the gas phase polymerization, e.g., as compared to feeding the metallocene and the stearyl containing compound(s) separately to the gas phase polymerization reactor, so that small, hot catalyst particles have the reduced agglomeration.

In some embodiments, the catalyst formulation does not include stearyl containing compounds during the catalyst manufacturing process. In this case the catalyst formulation may be slurried in a hydrocarbon diluent, such as mineral oil. The stearyl containing compounds may be added in-line to a slurry feed on the way to the polymerization reactor, thus being preblended in this manner.

The metallocene represented by the following formula:

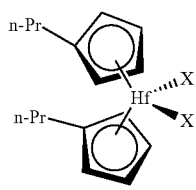

where each n-Pr is n-propyl, and each X is independently $CH_3$, Cl, Br or F may be prepared by a known process, such as by repeated deprotanations/metallations of the aromatic ligands and introduction of the central atom by their halogen derivatives. Known processes for preparing metallocenes are discussed in the Journal of Organometallic Chem., volume 288, (1985), pages 63-67, and EP-A-320762. Both documents are herein fully incorporated by reference.

The stearyl containing compound can be prepared by a known process utilizing stearic acid and/or a derivative thereof. Bis 2-hydroxyethyl stearyl amine may be represented by the following formula:

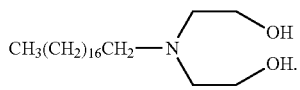

Aluminum distearate may be represented by the following formula:

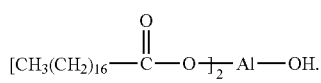

The catalyst formulations disclosed herein can include a support, which may also be referred to as a carrier. One or more embodiments of the present disclosure provide that the support is a porous support. Examples of the support include, but are not limited to, talc, inorganic oxides, inorganic chlorides, for example magnesium chloride and resinous support materials such as polystyrene or polystyrene-divinyl benzene, polyolefins or polymeric compounds or any other organic support material and the like, or mixtures thereof.

Inorganic oxides include metal oxides of Groups 2, 3, 4, 5, 13 or 14. One or more embodiments of the present disclosure provide that the support includes silica, alumina, silica-alumina, and/or a mixture thereof. Other inorganic oxides, which may be employed either alone or in combination with the silica, alumina or silica-alumina are magnesia, titania, zirconia, and the like.

The support can have a surface area in a range of from about 10 to about 700 $m^2/g$, a pore volume in a range of from about 0.1 to about 4.0 $cm^3/g$, and an average particle size in the range of from about 10 to about 500 μm. For one or more embodiments, the support surface area is in the range of from about 50 to about 500 $m^2/g$, the pore volume is in the range of from about 0.5 to about 3.5 $cm^3/g$, and the average particle size is in the range of from about 20 to about 200 μm. For one or more embodiments, the surface area range is from about 100 to about 400 $m^2/g$, the pore volume is from about 0.8 to about 3.0 $cm^3/g$, and the average particle size is from about 10 to about 100 μm. The pore size of the support can be in a range of from about 10 to about 1000° A, from about 50 to about 500° A, or from about 75 to about 350° A.

Embodiments of the present disclosure provide that the support may be treated prior to being utilized in the catalyst formulations disclosed herein. For example, the support may be calcined prior to forming the catalyst formulations. Calcination may remove water from the support and/or effectuate a chemical change on a surface of the support. The support may be calcined at a calcination temperature in a range from 200 to 650° C. For one or more embodiments, the support may be calcined at a calcination temperature in a range from 300 to 650° C., 400 to 650° C., or 500 to 650° C. For one or more embodiments, the support may be calcined at a calcination temperature of 600° C.

Calcination of the support can be performed using a known process. For instance, a fluidized bed of the support may be heated to a desired calcination temperature. The support can be maintained at the desired calcination temperature for 1 to 24 hours, after which the support can be cooled to ambient temperature.

The catalyst formulations disclosed herein can include an activator. An activator is defined in a broad sense as any combination of materials that increases the rate at which the metallocene oligomerizes or polymerizes unsaturated monomers, such as olefins. The catalyst component(s), e.g., the metallocene represented by the following formula:

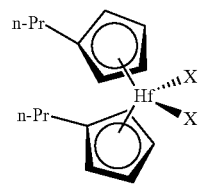

wherein each n-PR is n-propyl, and each X is independently $CH_3$, Cl, or F, may be activated for oligomerization and/or polymerization catalysis in any manner sufficient to allow coordination or cationic oligomerization and/or polymerization. The activator may be a Lewis-base, such as for example, diethyl ether, dimethyl ether, ethanol, or methanol. Other activators that may be used include those described in WO 98/07515 such as tris (2,2',2"-nonafluorobiphenyl) fluoroaluminate. Examples of the activator include, but are not limited to, ionizing activators; perchlorates, periodates and iodates including their hydrates; lithium (2,2'-bisphenyl-ditrimethylsilicate).4THF; organo-boron-aluminum activators; and silylium salt in combination with a non-coordinating compatible anion.

The activator may be an alumoxane. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180. The alumoxane may contain 4 to 20 of the following units, e.g., repeating units:

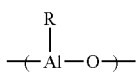

where R is a $C_1$ to $C_8$ alkyl, including mixed alkyls. One or more embodiments of the present disclosure provide that that activator is methylalumoxane (MAO).

The catalyst formulations disclosed herein can be formed by a known process. Components of the catalyst formulations may be combined in a number of different ways. For instance, the metallocene and the activator may be combined, e.g., to form a solution. The solution including the metallocene and the activator can be formed by combining a metallocene solution and an activator solution. The solutions can include a solvent, e.g. a liquid capable of forming a solution with the metallocene and/or the activator. Examples of the solvent include, but are not limited to, hydrocarbons, such as cyclic aliphatics and aromatics. A specific example of the solvent is toluene. Thereafter the combined metallocene and activator can be combined with the support and then dried to form the catalyst formation. When combining the metallocene and the activator solutions with the support, a total volume of the solution added can be less than four times the pore volume of the support. For example, the total volume of the solution added can be less than three times the pore volume of the support or less than two times the pore volume of the support. The total volume of the solution added can in the range of about 0.8 to about 4 times; about 0.9 to about 1.5 times; or about 0.9 to about 1.25 times the pore volume of the support. Procedures for determining the pore volume of the support are known in the art; details of one of these procedures is discussed in Volume 1, Experimental Methods in Catalytic Research (Academic Press, 1968) (specifically see pages 67-96).

One or more embodiments provide that the catalyst formulation is formed by combining the metallocene and the activator, e.g., to form a solution. Then the combined metallocene and activator solution can be combined with the support. Thereafter the combined metallocene, activator, and support can be combined with the bis 2-hydroxyethyl stearyl amine and then dried to remove residual solvent and form the catalyst formulation.

One or more embodiments provide that the catalyst formulation is formed by combining the metallocene and the activator, e.g., to form a solution. Then the combined metallocene and activator can be combined with the support and then dried to remove residual solvent. Thereafter the combined metallocene and activator can be combined, e.g., dry blended, with aluminum distearate to form the catalyst formation.

One or more embodiments provide that the catalyst formulation is formed by combining the metallocene and the activator, e.g., to form a solution. Then the combined metallocene and activator solution can be combined with the support. Thereafter the combined metallocene, activator, and support can be combined with the bis 2-hydroxyethyl stearyl amine can be then dried to remove residual solvent and form the catalyst formation. Thereafter the combined metallocene, activator, support, and bis 2-hydroxyethyl stearyl amine can be combined, e.g., dry blended, with aluminum distearate to form the catalyst formulation.

One or more embodiments provide that the catalyst formulation is formed by combining, for example contacting, the activated metallocene discussed herein and the stearyl containing compound. As discussed herein, the activated metallocene may be supported. One or more embodiments provide that the activated a metallocene and the stearyl containing compound may be combined on the way to the polymerization reactor, e.g., the activated metallocene and the stearyl containing compound may be combined as a feed to the polymerization reactor. One or more embodiments provide that the activated metallocene and the stearyl containing compound may be combined within the polymerization reactor, e.g., the activated metallocene and the stearyl containing compound may separate feeds to the polymerization reactor.

Embodiments of the present disclosure provide that a mole ratio of metal of the activator, e.g., the alumoxane, to the hafnium of the metallocene is in a range of ratios between 10:1 to 800:1. For example, the mole ratio of metal of the activator to the hafnium of the metallocene can be in a range of ratios between 20:1 to 500:1; or 50:1 to 400:1.

Embodiments of the present disclosure provide that, when utilized, the bis 2-hydroxyethyl stearyl amine may be utilized from about 0.1 to about 100 weight percent, from about 0.2 to about 50 weight percent, from about 0.3 to about 25 weight percent, about 0.1 to about 5 weight percent, from about 0.25 to about 3.5 weight percent, or from about 0.3 to about 3.5 weight percent based on a total weight of the catalyst formulation components.

Embodiments of the present disclosure provide that, when utilized, the aluminum distearate may be utilized from about 0.1 to about 100 weight percent, from about 0.2 to about 50 weight percent, from about 0.3 to about 25 weight percent, about 0.1 to about 5 weight percent, from about 0.25 to about 3.5 weight percent, or from about 0.3 to about 3.5 weight percent based on a total weight of the catalyst formulation components.

As mentioned, the catalyst formulations disclosed herein may be feed into a gas phase polymerization reactor. The catalyst formulations may be utilized in the form of a slurry, e.g. in a suitable liquid vehicle, or may be in the form of a dry powder.

Additional catalysts may be utilized with the catalyst formulations disclosed herein. An additional catalyst may be a component of the catalyst formulation, or the additional catalyst may can be fed to the gas phase polymerization reactor separately from the catalyst formulation. Examples of additional catalysts include, but are not limited to, Ziegler-Natta catalysts and Phillips-type chromium catalyst well known in the art, such as transition metal catalysts that may be represented by the formula: MRx, where M is a metal from Groups IIIB to VIII, R is a halogen or a hydrocarbyloxy group, and x is the valence of the metal M; transition metal catalyst compounds based on magnesium/titanium electron-donor complexes; type vanadium catalyst compounds; catalyst compounds disclosed in U.S. Pat. Nos.

4,124,532, 4,302,565, 4,302,566 and 5,763,723 and published EP-A2 0 416 815 A2 and EP-A1 0 420 436; transition metal catalyst compounds that may be represented by the formula $M^3M^4_v\ X^2_c\ R^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1; organometallics that can are represented by the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical; metallocenes; and "Group 15-containing" catalysts that include complexes of Group 3 to 12 metal atoms, wherein the metal atom is 2 to 8 coordinate, the coordinating moiety or moieties including at least two Group 15 atoms, and up to four Group 15 atoms. Various amounts of additional catalyst may be utilized for different applications.

The polymerization may be a polymerization of one or more olefin monomers. The olefin monomer can have from 2 to 30 carbon atoms. For instance, the olefin monomers can have from 2 to 12 carbon atoms, or 2 to 8 carbon atoms. Examples of olefin monomers that may be utilized include, but are not limited to, ethylene, propylene, butene-1, pentene-1, 4-methyl-pentene-1, hexene-1, oetene-1, decene-1, and combinations thereof.

Additional monomers may also be utilized, such as ethylenically unsaturated monomers, diolefins having 4 to 18 carbon atoms, conjugated or nonconjugated dienes, polyenes, vinyl monomers and cyclic olefins. Examples of the additional monomers that may be utilized include, but are not limited to, norbomene, norbornadiene, isobutylene, vinylbenzocyclobutane, styrenes, alkyl substituted styrene, ethylidene norbornene, isoprene, dicyclopentadiene, cyclopentane, and combinations thereof.

The gas phase polymerization may include a continuous cycle, where in one part of the cycle of a reactor system, a cycling gas stream, which may be referred to as a recycle stream or fluidizing medium, is heated in the reactor by the heat of polymerization. This heat can be removed from the recycle composition in another part of the cycle by a cooling system external to the gas phase polymerization reactor. Generally, in a gas phase polymerization for producing polymers, a gaseous stream containing one or more monomers is continuously cycled through a fluidized bed in the presence of a catalyst, i.e. the catalyst formulation disclosed herein that has been fed to the gas phase polymerization reactor, under reactive conditions. The gaseous stream can be withdrawn from the fluidized bed and recycled back into the reactor. Simultaneously, polymer product can be withdrawn from the reactor and fresh monomer and/or catalyst can be added to replace the polymerized monomer. Suitable polymerization processes are described in U.S. Pat. Nos. 4,543,399, 4,588,790, 5,028,670, 5,317,036, 5,352,749, 5,405,922, 5,436,304, 5,453,471, 5,462,999, 5,616,661, 5,627,242, 5,665,818, 5,668,228, 677,375 and European publications EP-A-0 794 200, EP-A-0 802 202, EP-A2 0 891 990 and EP-B-634 421. These documents are each fully incorporated herein by reference.

The pressure in the gas phase polymerization process may be from about 100 psig (690 kPa) to about 500 psig (3448 kPa). For instance, pressure in the gas phase polymerization process may in the range of from about 200 psig (1379 kPa) to about 400 psig (2759 kPa), or from about 250 psig (1724 kPa) to about 350 psig (2414 kPa).

The gas phase polymerization reactor temperature may be from about 30 to about 120° C. For instance, the gas phase polymerization reactor temperature may be from about 60 to about 115° C., from about 70 to 110° C., or from about 70 to about 95° C. The gas phase polymerization reactor can produce from 500 lbs of polymer per hour (227 Kg/hr) to about 200,000 lbs/hr (90,900 Kg/hr) or higher of polymer.

As mentioned, utilizing the catalyst formulations disclosed herein, i.e. feeding the catalyst formulations into the gas phase polymerization reactor, may help reduce gel precursor formation. While not being bound to theory, the reduction of gel precursor formation may result from a reduction of agglomeration of small, hot catalyst particles and/or the scavenging of un-bound active species in the gas phase polymerization reactor.

Additionally, one or more embodiments of the present disclosure provides methods for reducing agglomeration of catalyst particles in a gas phase polymerization reactor. As discussed, a method for reducing agglomeration may include feeding the catalyst formulations disclosed herein into a gas phase polymerization reactor.

Further, a method for reducing agglomeration may include injecting a catalyst, e.g., the catalyst formulations disclosed herein, into a gas phase polymerization reactor via a catalyst injector having a support tube velocity that is at least equal to a catalyst tube velocity. Advantageously, it has been found that such catalyst injection can provide desirable dispersion, so that the catalyst particles are very quickly dispersed, e.g., separated, which can help reduce agglomeration of the catalyst particles, as to a catalyst injector having a support tube velocity that is not at least equal to a catalyst tube velocity. In some embodiments, the catalyst injector is an effervescent injector.

FIG. 1 illustrates a schematic diagram of a catalyst injector 100 in accordance with one or more embodiments described. The injector 100 includes an annulus 185 defined by an inner surface of a first conduit 120 and an outer surface of a second conduit 140, an annulus 187 within the second conduit 140, and an annulus 190 defined by an inner surface of a support member 150 and an outer surface of the first conduit 120. Each of the annulus 185, annulus 187, and annulus 190 can be in independent fluid communication with respective feed lines that can provide one or more monomers, purge gases, and catalyst to the injector 100.

One or more embodiments provides that the catalyst formulations disclosed herein may be provided to, e.g., injected into, the annulus 185; a purge gas, which may also be referred to as an inert gas, such as nitrogen, may be provided to the annulus 187; and one or more monomers can be provided to the annulus 190. Each of annulus 185, annulus 187, and annulus 190 can have different sizes, e.g. inner diameters, for various applications.

As mentioned, the purge gases can be provided to the annulus 187 within the second conduit 140. The purge gas can be dispersed into at least a portion of the annulus 185 via one or more orifices 145 arranged about the second conduit 140. The purge gas can mix with the catalyst slurry when contacted within the annulus 185 and further mix in a mixing zone 180 prior to being injected into the gas phase polymerization reactor. The mixture of catalyst slurry and purge gas is sprayed into the support tube purge stream, which includes one or more monomers from annulus 190, and mixes into a fluidized bed of polymer in the gas phase polymerization reactor. Providing that the support tube velocity is at least equal to a catalyst tube velocity can help to provide improved dispersion, thereby reducing agglomeration of the incoming catalyst particles.

A ratio of support tube velocity to the catalyst tube velocity can be between 1.0 to 10.0; 1.1 to 7.5; 1.2 to 5.0, 1.3 to 3.0 or 1.4 to 2.5. For instance, the ratio of support tube velocity to injection tube velocity can range from a lower limit of 1.0. 1.1, 1.2, 1.3 or 1.4 to an upper limit of 2.5, 3.0, 5.0 or 10.0.

When utilized with the catalyst injector 100, the catalyst formulations disclosed herein may be slurried, e.g., include a liquid. Suitable liquids include, but are not limited to, non-functional hydrocarbons and aliphatic hydrocarbons such as butane, isobutane, ethane, propane, pentane, isopentane, hexane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, and the like; and petroleum fractions such as gasoline, kerosene, light oils, and the like. Likewise, halogenated hydrocarbons such as methylene chloride, chlorobenzene, and the like, can also be used. "Non-functional", indicates that the liquids do not contain groups such as strong polar groups, which may deactivate active transition metal sites.

The catalyst slurry can have a flow rate of 1 lb per hour (lb/hr) (0.4 kg/hr) to 150 lb/hr (68 kg/hr); 3 lb/hr (1.4 kg/hr) to 100 lb/hr (45.4 kg/hr); or 5 lb/hr (2.3 kg/hr) to 50 lb/hr (22.7 kg/hr). For instance, the catalyst slurry flow rate can range from a low of 1 lb per hour (lb/hr) (0.4 kg/hr), 3 lb/hr (1.4 kg/hr), or 5 lb/hr (2.3 kg/hr), to a high of 50 lb/hr (22.7 kg/hr), 100 lb/hr (45.4 kg/hr), or 150 lb/hr (68 kg/hr).

The purge gas can have a flow rate between 1 lb/hr (0.4 kg/hr) and 40 lb/hr (18.1 kg/hr). For instance, the purge gas flow rate can range from a low of 1 lb/hr (0.4 kg/hr), 2 lb/hr (0.8 kg/hr), or 4 lb/hr (1.6 kg/hr) to a high of 8 lb/hr (3.2 kg/hr), 20 lb/hr (9.1 kg/hr), or 40 lb/hr (18.1 kg/hr).

The monomer flow can have a flow rate between 1,000 lb/hr and 5,000 lb/hr (455 kg/hr to 2,273 kg/hr). For instance, the monomer flow rate can range from a low of 1,000 lb/hr (455 kg/hr), 1,500 lb/hr (682 kg/hr), or 2,000 lb/hr (907 kg/hr) to a high of 2,200 lb/hr (1,000 kg/hr), 2,500 lb/hr (1,136 kg/hr), or 5,000 lb/hr (2,273 kg/hr).

A number of effervescent catalyst injectors are known in the art. Suitable effervescent catalyst injectors are described in WO 2008/042177. This document is herein fully incorporated by reference.

Further, a method for reducing agglomeration may include reducing support, e.g., silica particle, fines. As previously discussed, the catalyst formulations disclosed herein can include a support. As used regarding support fines, the term "fines" refers to a fraction of the support particles that are smaller than the average of the entire population of support particles. As used herein, "mean particle diameter" includes "mean equivalent spherical diameter", e.g., for non-spherical particles.

One or more embodiments of the present disclosure provide that reducing support fines includes removing a portion, e.g., substantially all, of support particles that are more than 1.0, 1.5, 2.0, 2.5, or 3.0 standard deviations away from a mean particle diameter of a whole, e.g. an un-sieved, support particle population. One or more embodiments of the present disclosure provide that reducing support fines includes removing a portion, e.g., substantially all, of support particles that are more than 1.0 standard deviations away from a mean particle diameter of a whole, e.g. an un-sieved, support particle population. One or more embodiments of the present disclosure provide that reducing support fines includes removing a portion, e.g., substantially all, of support particles that are more than 1.5 standard deviations away from a mean particle diameter of a whole, e.g. an un-sieved, support particle population. One or more embodiments of the present disclosure provide that reducing support fines includes removing a portion, e.g., substantially all, of support particles that are more than 2 standard deviations away from a mean particle diameter of a whole, e.g. an un-sieved, support particle population. One or more embodiments of the present disclosure provide that reducing support fines includes removing a portion, e.g., substantially all, of support particles that are more than 2.5 standard deviations away from a mean particle diameter of a whole, e.g. an un-sieved, support particle population. One or more embodiments of the present disclosure provide that reducing support fines includes removing a portion, e.g., substantially all, of support particles that are more than 3.0 standard deviations away from a mean particle diameter of a whole, e.g. an un-sieved, support particle population. As used herein, "substantially all" refers to from 70 to 100 percent by volume of the support fines to be removed. All individual values and subranges from 70 to 100 percent by volume are included; for example, from a lower limit of 70, 75, or 85 to an upper limit of 100, 99, 98, or 95 percent by volume of the support fines to be removed may be removed. Advantageously, reducing small particles used in a polymerization process, such as support fines, can help reduce gel precursors and/or gels. One or more embodiments of the present disclosure provide that reducing support fines includes removing a different portion of a whole, e.g., un-sieved, support particle population.

Once the support fines have been reduced, e.g. the small support particles have been removed, a portion of remaining, e.g., retained, support particles may be utilized for a polymerization process. For instance, a portion of the remaining support particles may be utilized to form the catalyst formulations as disclosed herein. The catalyst formulation may then be utilized for a polymerization process, e.g. a gas phase polymerization.

Further, a method for reducing agglomeration may include reducing catalyst, e.g., catalyst particle, fines. As used regarding catalyst fines, the term "fines" refers to a fraction of the catalyst particles that are smaller than the average of the entire population of catalyst particles. One or more embodiments of the present disclosure provide that reducing catalyst fines includes removing a portion, e.g., substantially all, of catalyst particles that are more than 1.0, 1.5, 2.0, 2.5, or 3.0 standard deviations away from a mean particle diameter of a whole, e.g. an un-sieved, catalyst particle population.

Polymers produced utilizing the catalyst formulations disclosed herein are useful for films, sheets, and fiber extrusion and co-extrusion as well as blow molding, injection molding and rotary molding applications, among others. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

The polymers produced utilizing the catalyst formulations disclosed herein can have a density in a range of from 0.86 g/cm$^3$ to 0.97 g/cm$^3$. For instance, the polymers can have a density a range of from 0.88 g/cm$^3$ to 0.965 g/cm$^3$, from 0.900 g/cm$^3$ to 0.96 g/cm$^3$, from 0.905 g/cm$^3$ to 0.95 g/cm$^3$, or from 0.910 g/cm$^3$ to 0.940 g/c cm$^3$.

The polymers produced utilizing the catalyst formulations disclosed herein can have a weight average molecular weight to number average molecular weight ($M_w/M_n$) distribution from 1.5 to 15. For instance, the polymers can have a $M_w/M_n$ distribution from 2 to 10, from 2.2 to 8, or from 2.5 to 8. The $M_w/M_n$ distribution can be determined by gel permeation chromatography techniques known in the art.

The polymers produced utilizing the catalyst formulations disclosed herein can have a melt index (MI) or ($I_2$) as measured by ASTM-D-1238-E in the range from 0.01 dg/min to 1000 dg/min. For instance, the polymers can have a MI from 0.01 dg/min to 100 dg/min, from 0.1 dg/min to 50 dg/min, or from 0.1 dg/min to 10 dg/min.

As the catalyst formulations disclosed herein can help to provide a reduction of agglomeration of small, hot catalyst particles and/or the scavenging of un-bound active species in the gas phase polymerization reactor, advantageously, the polymers produced may have a reduced gel count. Gels, e.g. in films, may result from among other things relatively higher molecular weight species and/or from poorly distributed, e.g. agglomerated, catalyst particles. Gels may be aesthetically displeasing, reduce a quality of printing on the polymer, and/or undesirably provide mechanically weak areas of the film.

EXAMPLES

Linear low density polyethylene granules were produced in a commercial scale gas-phase fluidized bed reactor using XCAT™ VP-100 catalyst commercially available from Univation Technologies, LLC. The reactor conditions were set to produce polyethylene with the melt flow properties and densities shown in Table 1. Granular resin samples were collected prior after purging but prior to palletization. The samples were sieved with four different mesh screens to obtain four fractions respectively for Trial 1 and Trial 2. The mesh screens were 20 mesh, 30 mesh, and 45 mesh. Physical properties for Trial 1 and Trial 2 are reported in Tables 1-2. Melt index ($I_2$) was determined according to ASTM D-1238-E; flow index ($I_{21}$) was determined according to ASTM D-1238-F; density was determined according to ASTM D-792.

TABLE 1

| | Trial 1 | | | | |
|---|---|---|---|---|---|
| | Median particle size (μm) | Melt Index (g/10 min) | Flow Index (g/10 min) | Melt Index Ratio ($I_{21}/I_2$) | Density (g/cm$^3$) |
| LLDPE (unsieved) | 828 | 0.4415 | 12.039 | 27.3 | 0.9189 |
| Fraction 1 | 1164 | 0.4203 | 11.802 | 28.1 | 0.9187 |
| Fraction 2 | 758 | 0.3973 | 11.125 | 28.0 | 0.9189 |
| Fraction 3 | 509 | 0.4486 | 12.373 | 27.6 | 0.9193 |

TABLE 1-continued

| | Trial 1 | | | | |
|---|---|---|---|---|---|
| | Median particle size (μm) | Melt Index (g/10 min) | Flow Index (g/10 min) | Melt Index Ratio ($I_{21}/I_2$) | Density (g/cm$^3$) |
| Fines Fraction | 337 | — | — | — | — |

TABLE 2

| | Trial 2 | | | |
|---|---|---|---|---|
| | Median particle size (μm) | Melt Index (g/10 min) | Flow Index (g/10 min) | Melt Index Ratio ($I_{21}/I_2$) |
| LLDPE (unsieved) | 889 | 1.030 | 27.80 | 27.0 |
| Fraction 1 | 1267 | 1.074 | 29.72 | 27.7 |
| Fraction 2 | 756 | 0.946 | 25.58 | 27.0 |
| Fraction 3 | 483 | 0.989 | 28.15 | 28.5 |
| Fines Fraction | 314 | — | — | — |

For each of Trials 1-2, Fractions 1-3 were compounded with a Werner & Pfleiderer Extruder Twin Screw ZSK-57 unit, pelletized, and analyzed with an Optical Control Systems (OCS) FSA-100 Film Testing System mounted on a cast film line. Gels were detected when light transmitted through the web fell below a threshold. The threshold can be defined as a percentage of the background light transmitted through the web. For each of Trials 1-2, the Fines Fraction was combined with Fraction 1, which had the largest mean particle size. This combined Fraction was also compounded, pelletized, and analyzed with the OCS system. The results are reported in Tables 3-4.

TABLE 3

| | Trial 1 | | | | |
|---|---|---|---|---|---|
| | Gels <200 μm | Gels 200-600 μm | Gels 600-1200 μm | Gels >1200 μm | All Gels |
| LLDPE (unsieved) | 99 | 73 | 2 | 0 | 174 |
| Fraction 1 | 25 | 22 | 2 | 0 | 49 |
| Fraction 2 | 41 | 37 | 2 | 0 | 80 |
| Fraction 3 | 140 | 118 | 4 | 0 | 262 |
| Fraction 1 (combined with 20 wt % Fines Fraction) | 184 | 133 | 6 | 0 | 323 |
| Fraction 1 (combined with 40 wt % Fines Fraction) | 295 | 211 | 8 | 1 | 515 |
| Fraction 1 | 491 | 353 | 12 | 0 | 856 |

TABLE 3-continued

| | Trial 1 | | | | |
|---|---|---|---|---|---|
| | Gels <200 μm | Gels 200-600 μm | Gels 600-1200 μm | Gels >1200 μm | All Gels |
| (combined with 60 wt % Fines Fraction) | | | | | |

TABLE 4

| | Trial 2 | | | | |
|---|---|---|---|---|---|
| | Gels <200 μm | Gels 200-600 μm | Gels 600-1200 μm | Gels >1200 μm | All Gels |
| LLDPE (unsieved) | 52 | 36 | 3 | 0 | 91 |
| Fraction 1 | 20 | 14 | 1 | 0 | 35 |
| Fraction 2 | 22 | 19 | 2 | 0 | 43 |
| Fraction 3 | 75 | 59 | 7 | 0 | 141 |
| Fraction 1 (combined with 20 wt % Fines Fraction) | 205 | 137 | 8 | 0 | 350 |

The data of Tables 3-4 illustrates that more uniform and relatively larger size granules, i.e. Trials 1-2, Fraction 1, tended to have advantageously lower OCS gel numbers. Additionally, the data of Tables 3-4 illustrates that the addition of the Fines Fraction to Fraction 1 results in an undesirable increase in OCS gel numbers, as compared to Fraction 1 when not combined with the Fines Fraction.

While not wishing to be bound to theory, this data indicates that gels are formed from gel precursors, e.g., small particles. Accordingly, it is believed that reducing small particles, such as support fines, can advantageously reduce gel precursors and/or gels.

What is claimed:

1. A method comprising:

reducing support fines by removing a portion of support particles that are more than 1.0 standard deviations away from a mean particle diameter of a whole support particle population, wherein the particle size of the removed portion of support particles fines are smaller than an average particle size of the whole support particle population;

forming a catalyst formulation that includes a portion of retained support particles; and utilizing the catalyst formulation in a gas phase polymerization.

* * * * *